Sept. 1, 1931.     A. E. DOMAN     1,821,911
ELECTRIC MOTOR
Filed May 15, 1929
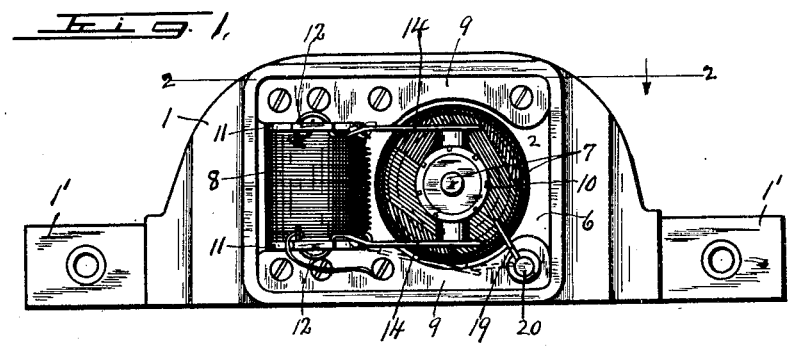
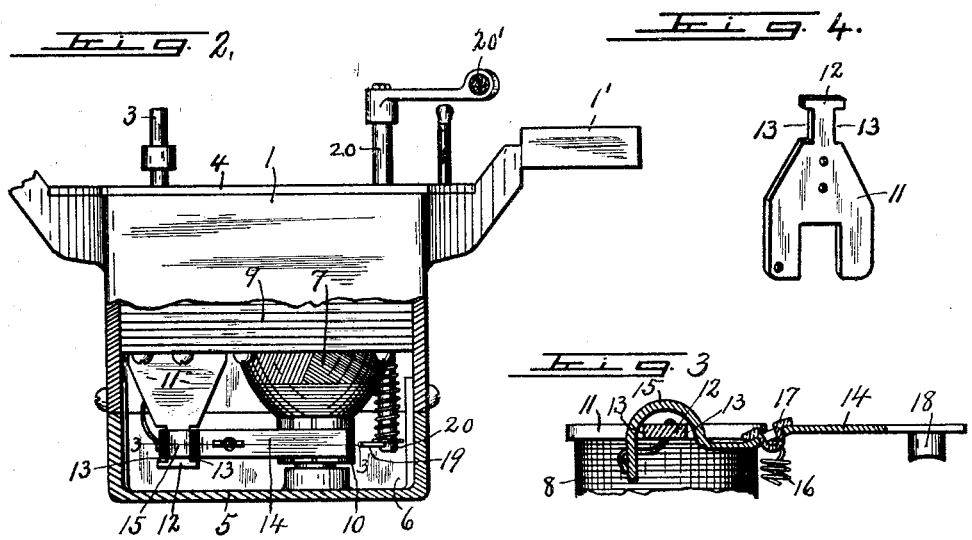
INVENTOR
A. E. Doman
WITNESS
J. T. Mains
BY
Denison & Thompson
ATTORNEYS Patented Sept. 1, 1931

1,821,911

UNITED STATES PATENT OFFICE

ALBERT E. DOMAN, OF ELBRIDGE, NEW YORK, ASSIGNOR TO MANDO COMPANY INCORPORATED, OF ELBRIDGE, NEW YORK, A COMPANY OF NEW YORK

ELECTRIC MOTOR

Application filed May 15, 1929. Serial No. 363,148.

This invention relates to an electric motor for windshield cleaners and other uses requiring relatively small, compact motor equipment in which an armature is rotatable between the pole pieces of a suitable field having plates of insulating material saddled upon the field core between the ends of the field winding and adjacent pole pieces, the armature being provided with a suitable commutator adapted to be engaged by brush-holders which are mounted upon the insulating plates.

The main object is to mount the brush-holder or brush holders directly upon these insulating plates.

Another object is to provide the plates with extensions having notches or recesses in which the adjacent ends of the brush-holders are seated to prevent axial displacement of the brush-holders therefrom.

Another object is to provide the brush-holders with open sided loops adapted to embrace the notched extensions and supporting plates in such manner as to permit free rocking movement of the brush-holders upon their respective supports toward and from the periphery of the commutator and also to permit said holders to be easily and quickly removed from said extensions when desired without interfering with other parts of the motor.

A further object is to connect the brush-holders by means of a relatively light coil spring for yieldingly holding them in contact with the commutator and permitting them to be readily separated and detached from their respective supports when desired.

Another object is to provide means operable at will for disengaging one of the brush holders from the commutator to break the motor circuit when necessary.

Other objects and uses relating to specific parts of the motor will be brought out in the following description.

In the drawings:

Figure 1 is an end view of the motor embodying the various features of my invention.

Figure 2 is a top plan, partly in section, taken in the plane of line 2—2 Figure 1.

Figure 3 is an enlarged detail sectional view taken in the plane of line 3—3, Figure 2.

Figure 4 is a perspective view of one of the detached brush holder-supports.

As illustrated this motor comprises a main supporting frame —1— of cast metal or equivalent material having opposite apertured end lugs —1'— for receiving bolts or equivalent fastening means by which the motor may be secured to the frame of a car or other support.

The front and rear sides of the frame or casing —1— are chambered and separated by a partition —2—, one chamber serving to receive the motor parts and the other chamber certain mechanism, not shown, for transmitting motion from the armature of the motor to a supporting shaft —3— for the wind-shield wiper, not shown. The opened rear side of the casing —1— is normally closed by a plate —4— while the open front side of the same casing is normally closed by a cap —5—, Figure 2, which also forms a continuation of the front chamber as —6— in which the motor parts are located.

The motor comprises a revolving armature —7—, a field winding —8— and opposite pole pieces —9— integrally united at one end to form a suitable core extending through the center of the field winding —6—, the other ends of the pole pieces being arranged at diametrically opposite sides of a commutator —10— on one end of the shaft of the armature —7—.

Suitable washer plates —11— of insulating material such as vulcanized fibre or its equivalent are saddled upon the connecting core for the pole pieces —9— at opposite ends of the field winding —8— and are provided with reduced ends —12— extending in the direction of the axis of the armature —7— and across the plane of rotation of the commutator —10—.

The opposite edges of each of the reduced extensions —12— of the insulator plates —11— are provided with notches or recesses —13— for receiving corresponding ends of a pair of commutator brush-holders —14— which are looped around the portions of the extensions between the notches —13— so that portions of each loop may engage in the notches of the corresponding plate —11—. As shown more clearly in Figure 3, the outer end of each of the brush-holders —14— is provided with a loop —15— open at one side to form opposite arms adapted to enter the notches in corresponding sides of the extension —12— so that the shoulders at the ends of the notches may hold the brush holders from endwise displacement from the adjacent plate —11—, while at the same time permitting rocking movement of the brush-holder about the reduced portion of the extension —12— between the notches —13—.

The open side of each loop —15— is sufficiently wide to permit the loop to be displaced from the extension —12— when desired but the loops of both portions are normally and yieldingly held on the reduced portions —12— of both plates 11 by means of a coil spring 16 having its opposite ends connected to suitable insulators 17 on the brush holders between the ends thereof, as shown more clearly in Figure 3.

The inner ends of the brush-holders —14— are provided with inwardly projecting brush members —18— having concave inner faces for engagement with the periphery of the commutator —10— and are yieldingly held in contact with the commutator by the spring —16—.

One, at least, of the brush-holders —14— extend some distance beyond its corresponding contact brush —18— into the path of movement of a switch member —19— which is secured to a rock shaft —20—, Figures 1 and 2, for the purpose of engaging the corresponding brush-holder —14— and forcing it out of engagement with the commutator to break the motor circuit when desired.

The rear end of the shaft —20— is provided with an operating crank arm —20'— adapted to be operated at will for rocking the shaft —20— thereby effecting a corresponding movement of the switch member —19— and adjacent brush-holder —14—.

It is now evident that the insulating plates —11— perform the double function of supporting the commutator brushes —14— thereby reducing the number of parts and simplifying the construction of the motor. The particular construction of the brush-holders and their insulator supports —11— also greatly facilitates the assembling of the holders in operative position and permits them to be readily removed and replaced when necessary without disturbing any of the other parts of the motor.

Furthermore, the spring —16— connecting the intermediate portions of both of the brush-holders assures a uniform pressure of said brushes upon the commutator —10— and permits them to be readily separated a sufficient distance to allow the armature of the motor to be withdrawn from between them.

What I claim is:

1. In an electric machine having a stator core provided with a field-winding, a revolving armature having a current commutator, in combination with insulator plates saddled upon opposite ends of the core, and brush-holders having corresponding ends attached to their respective plates and their other ends spring-pressed toward each other and provided with brushes for engaging the commutator.

2. In an electric machine having a stator core provided with a field-winding, a revolving armature having a commutator, in combination with insulator plates secured between the ends of the field-winding and pole pieces of the field-magnet and provided with notched extensions in the plane of rotation of the commutator, and brush-holders having corresponding ends provided with open-sided loops embracing the notched extensions and their opposite end spring pressed toward each other and provided with brushes for engaging the commutator.

3. The combination with the field winding, field insulating washer, and rotary armature of a dynamo or motor having a current collector rotating with the armature, of a brush holder mounted upon said insulating washer and spring pressed toward the collector for engaging the brush therewith.

4. In an electric machine, a field winding, a field-insulating washer and a rotary collector, in combination with a brush holder mounted upon said insulating washer and spring-pressed toward the collector for engaging the brush therewith.

5. In an electric motor, a brush-holder, and a support therefor consisting of an insulator plate having one end relatively wide and provided with an opening and its other end relatively narrow and provided with recesses in its opposite edges and shoulders at opposite ends of both recesses, said brush-holder having one end provided with a loop embracing the narrow portion of the plate between said shoulders, and its other end provided with a brush.

In witness whereof I have hereunto set my hand this 9th day of May, 1929.

ALBERT E. DOMAN.